US007323972B2

(12) United States Patent
Nobusawa

(10) Patent No.: US 7,323,972 B2
(45) Date of Patent: Jan. 29, 2008

(54) VEHICLE EMERGENCY NOTIFICATION SYSTEM AND RELATED METHOD

(75) Inventor: Hisashi Nobusawa, Fujisawa (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 181 days.

(21) Appl. No.: 10/954,187

(22) Filed: Oct. 1, 2004

(65) Prior Publication Data

US 2005/0264403 A1 Dec. 1, 2005

(30) Foreign Application Priority Data

Oct. 3, 2003 (JP) ........................... P2003-346020

(51) Int. Cl.
*B60Q 1/00* (2006.01)

(52) U.S. Cl. ................. 340/436; 340/438; 340/539.18; 340/901; 701/301

(58) Field of Classification Search ........... 340/539.18, 340/436
See application file for complete search history.

(56) References Cited

U.S. PATENT DOCUMENTS

| | | | | |
|---|---|---|---|---|
| 6,293,362 | B1 * | 9/2001 | Sasaki et al. | 180/274 |
| 6,337,641 | B1 | 1/2002 | Yoshioka et al. | |
| 6,377,165 | B1 * | 4/2002 | Yoshioka et al. | 340/425.5 |
| 6,617,979 | B2 * | 9/2003 | Yoshioka | 340/901 |
| 2003/0128123 | A1 * | 7/2003 | Sumiya et al. | 340/573.1 |
| 2003/0212480 | A1 * | 11/2003 | Lutter et al. | 701/33 |
| 2004/0002815 | A1 * | 1/2004 | Ishizaki et al. | 701/300 |

FOREIGN PATENT DOCUMENTS

| | | | |
|---|---|---|---|
| EP | 0 936 794 | A2 | 8/1999 |
| EP | 1 205 365 | A2 | 5/2002 |
| JP | 2000-115413 | | 4/2000 |
| JP | 2002-187510 | | 7/2002 |

* cited by examiner

*Primary Examiner*—George Bugg
(74) *Attorney, Agent, or Firm*—McDermott Will & Emery LLP

(57) ABSTRACT

A vehicle emergency notification system is installed on a vehicle to transmit an emergency notification signal to a base station when a collision occurs and provide with a collision sensor sensing a collision of the vehicle, a notification switch whose operation is permitted when the collision sensor senses the collision, and a communicating section transmitting an emergency notification signal to the base station. The communicating section allows the emergency notification signal to be transmitted to the base station when the notification switch is turned on.

9 Claims, 3 Drawing Sheets

VEHICLE EMERGENCY NOTIFICATION SYSTEM AND RELATED METHOD

BACKGROUND OF THE INVENTION

The present invention relates to a vehicle emergency notification system and a method and, more particularly, to an emergency notification system and its related method wherein in the even of a collision of a vehicle typically with a pedestrian, an emergency notification signal is transmitted to a rescue center.

Japanese Patent Application Laid-Open Publication Nos. 2000-115413 and 2002-187510 disclose a technology for detecting a collision of a vehicle to recognize the activation of an air bag for thereby actuating an emergency notification system to call a rescue request in the event of an accident.

Further, a lift-up hood system has been proposed wherein a collision detection sensor, mounted on a bumper of the vehicle, senses the collision between a vehicle and a pedestrian and when the collision is detected, a hood (bonnet) of the vehicle is lifted upward to minimize effect to the pedestrian.

SUMMARY OF THE INVENTION

However, upon studies conducted by the present inventor, with such a lift-up hood system, since the collision is detected by a touch sensor, it is hard to distinguish and discriminate if the pedestrian is involved in the collision or an object other than the pedestrian is involved in the collision, and it is conceivable that there is still room for improvement over appropriateness in judgment as to whether to activate the emergency notification system in the event of the collision.

That is, even if such a lift-up hood system is merely combined with the emergency notification system adapted to operate in conjunction with the activation of the air bag system, the emergency notification signal is liable to be transmitted even in the absence of a need to provide notification like in the event of a mild contact between the vehicle and the object.

The present invention has been completed upon consideration of the above studies conducted by the present inventor and has an object to provide an emergency notification system and its related method wherein when there is a need for transmitting an emergency notification signal in the event of a collision, the emergency notification signal can be reliably transmitted to a base station.

To achieve the above object, according to one aspect of the present invention, there is provided a vehicle emergency notification system installed on a vehicle to transmit an emergency notification signal to a base station when a collision occurs, the system comprising: a collision sensor sensing a collision of a vehicle; a notification switch whose operation is permitted when the collision sensor senses the collision; and a communicating section transmitting an emergency notification signal to a base station, the communicating section allowing the emergency notification signal to be transmitted to the base station when the notification switch is turned on.

Stated another way, according to another aspect of the present invention, there is provided a vehicle emergency notification system installed on a vehicle to transmit an emergency notification signal to a base station when a collision occurs, the system comprising: collision detection means for detecting a collision of a vehicle; notification selection means for selecting notification to a base station, operation of the notification selection means being permitted when the collision detection means detects the collision; and communication means for transmitting an emergency notification signal to the base station and operative to transmit the emergency notification signal to the base station when the notification selection means is turned on.

In the meanwhile, according to another aspect of the present invention, there is provide a vehicle emergency notification method transmitting an emergency notification signal to a base station when a collision of a vehicle occurs, the method comprising: detecting a collision of a vehicle; displaying a notification switch when the collision is detected; and transmitting an emergency notification signal to a base station when the notification switch is turned on.

Other and further features, advantages, and benefits of the present invention will become more apparent from the following description taken in conjunction with the following drawings.

DETAILED DESCRIPTION OF THE PREFERRED EMBODIMENT

Hereinafter, a vehicle emergency notification system and its related method of an embodiment according to the present invention are described in detail with reference to FIGS. 1 to 4 of the accompanying drawings.

Figure 1:
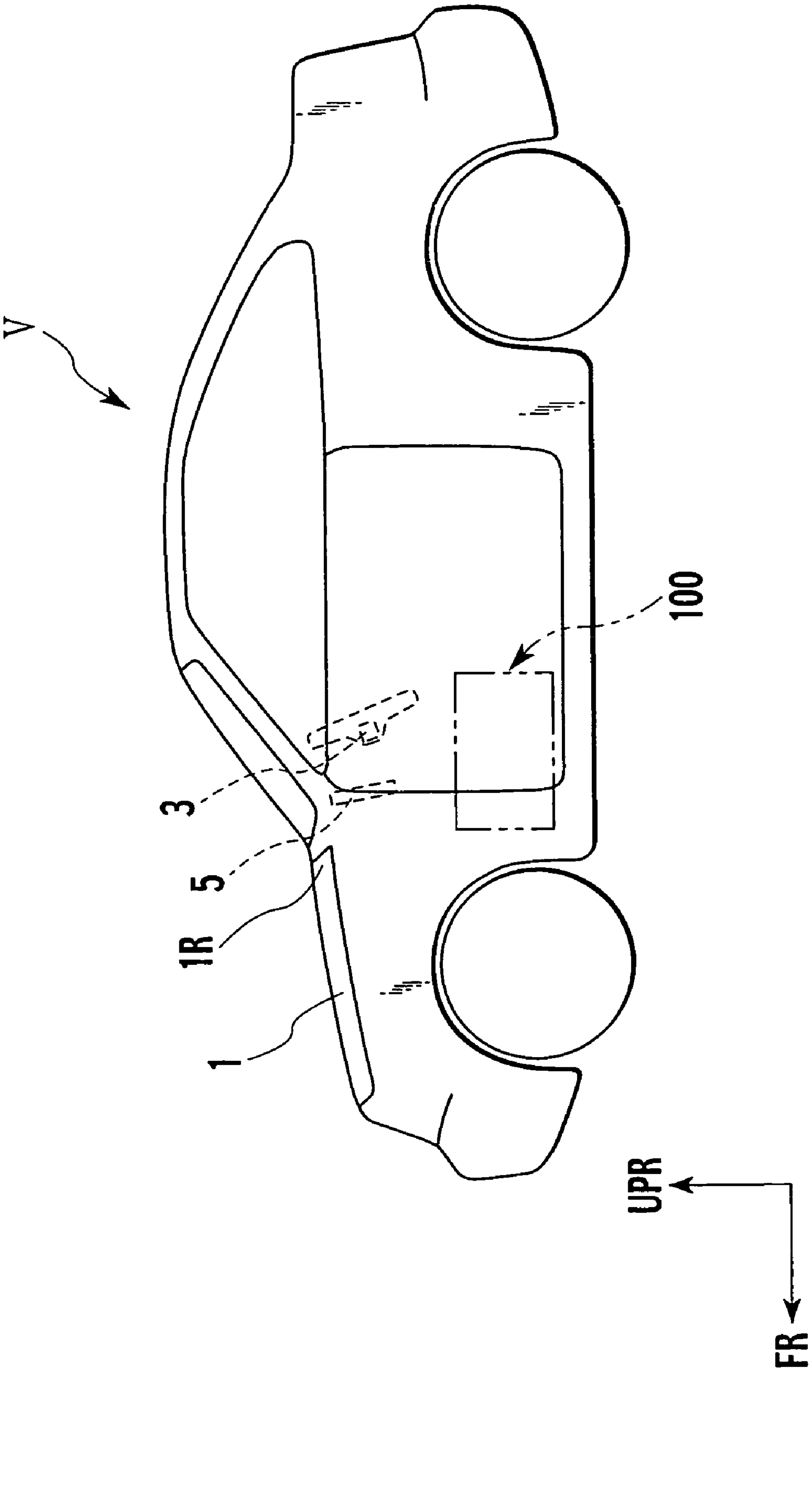
FIG. 1 is a schematic side view of a vehicle installed with a vehicle emergency notification system of an embodiment according to the present invention.

FIG. 1 is a schematic side view of the vehicle that is installed with a vehicle emergency notification system of the presently filed embodiment. Incidentally, in FIG. 1, an arrow FR indicates a forward direction of a vehicle V and an arrow UPR indicates an upward direction of the vehicle V.

As shown in FIG. 1, the vehicle emergency notification system 100 of the presently filed embodiment is installed on the vehicle V The vehicle V has a hood 1, serving as a closure body, which is located in an upper area of an engine room in a front part of the vehicle. Further, the vehicle V is equipped with a an air bag device 3, which serves as an auxiliary restraint device for restraining an occupant in an auxiliary fashion by deploying toward the occupant, and a display device 5 enabled to provide the occupant with a variety of information. Incidentally, while the air bag device 3 has been shown in the drawing to assume a position in front of a driver in opposition thereto, the air bag device is not limited to such a particular layout and alteration may include a structure wherein the air bag is located in opposition to the driver at a side thereof or the air bag is located in position to other occupant. Moreover, although the display device 5 typically includes a display device of a navigation device that is located at a center of an instrument panel of the vehicle, of course, the display device is not limited to such a particular structure and the display device may be suffice to have a structure that is able to provide the occupant with ease of access to obtain necessary information.

Figure 2:
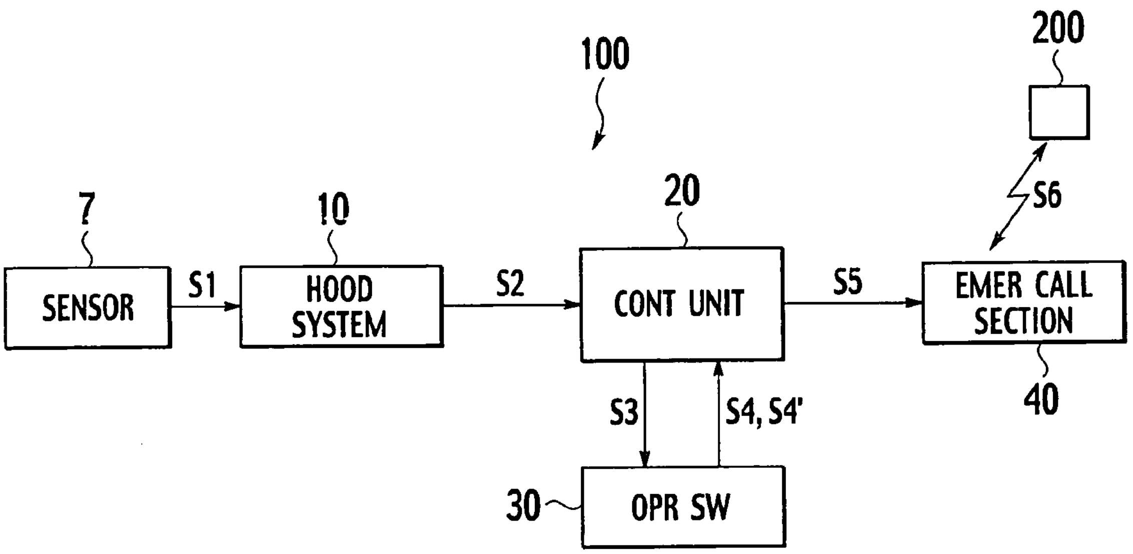
FIG. 2 is a block diagram illustrating a structure of the vehicle emergency notification system of the presently filed embodiment.

FIG. 2 is a block diagram illustrating a further detailed structure of the vehicle emergency notification system 100.

As shown in FIG. 2, the vehicle emergency notification system 100 is comprised of a collision sensor 7 such as an accelerator sensor, a lift-up hood system 10, an air bag control unit 20, an operation switch 30 and an emergency call section (communication system) 40.

In particular, the lift-up hood system 10 is enabled to alleviate impact occurring when the vehicle collides with a pedestrian, which is located typically in front of the vehicle V and caused to be moved on the hood 1 of the vehicle V rearward due to the collision, by lifting up a rear end portion 1R of the hood 1 in response to a detection signal S1 delivered from the collision sensor 7 when the collision sensor 7 senses the collision. Also, upon receipt of an actuation signal S2, indicative of the occurrence of the activation of the lift-up hood system 10 to lift up the hood 1, which is delivered from the lift-up hood system 10, the air bag control unit 20 activates the air bag device 3 to deploy the air bag while transmitting a permission signal S3 to the operation switch 30, and when operation signals S4, S4' are inputted from the operation switch 30, an emergency notification signal S5 is emergently outputted to the emergency call section 40. Moreover, when applied with the emergency notification signal S5 from the air bag control unit 20, the emergency call section 40 transmits an emergency notification signal S6, which carries the same content as that of the emergency notification signal S5, to a rescue center 200.

Figure 3:
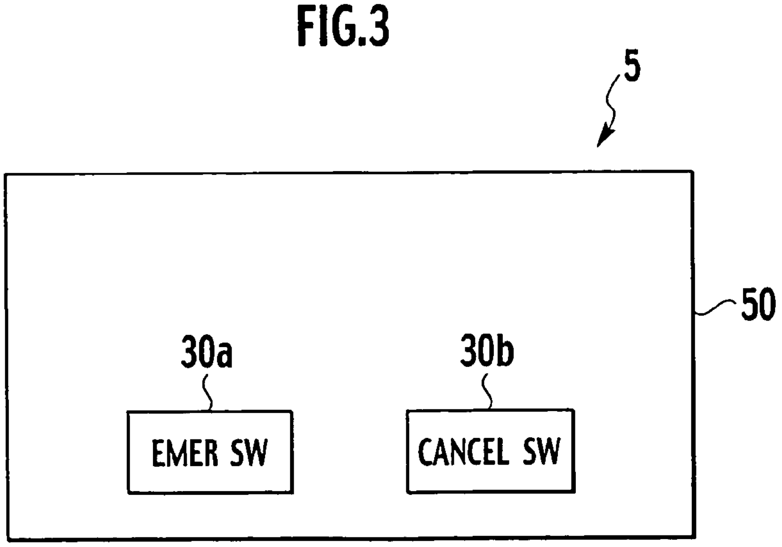
FIG. 3 is a view illustrating an emergency switch and a cancel switch to be displayed over a display screen of a display device of the vehicle emergency notification system of the presently filed embodiment.

FIG. 3 is a view showing an emergency switch 30*a* and a nearby cancel switch 30*b*, both forming the operation switch 30, which are displayed over a display screen 50 of the display device 5 used for the vehicle emergency notification system 100.

As shown in FIG. 3, the operation switch 30 typically takes the form of a touch type switch that is displayed over the display screen 50 of the display device 5 of the navigation system installed on the vehicle V and includes the emergency switch (notification switch) 30*a* and the nearby cancel switch (switch for canceling emergency notification) 30*b* which is located so as to be closed to the emergency switch 30*a*. The switches 30*a*, 30*b* are not usually displayed over the display screen 50 in which there is displayed a screen for navigation (normal display screen), and the switches 30*a*, 30*b* are displayed when a collision is detected by the collision sensor 7. Incidentally, the switches 30*a*, 30*b* may take the form in which the normal display screen is turned off to allow only the switches 30*a*, 30*b* to be displayed and depending on circumstances, these switches may be superimposed in display together with the normal display screen remaining unchanged.

Next, the operation of the vehicle emergency notification system 100 with the structure set forth above is described with reference to FIG. 4.

Figure 4:
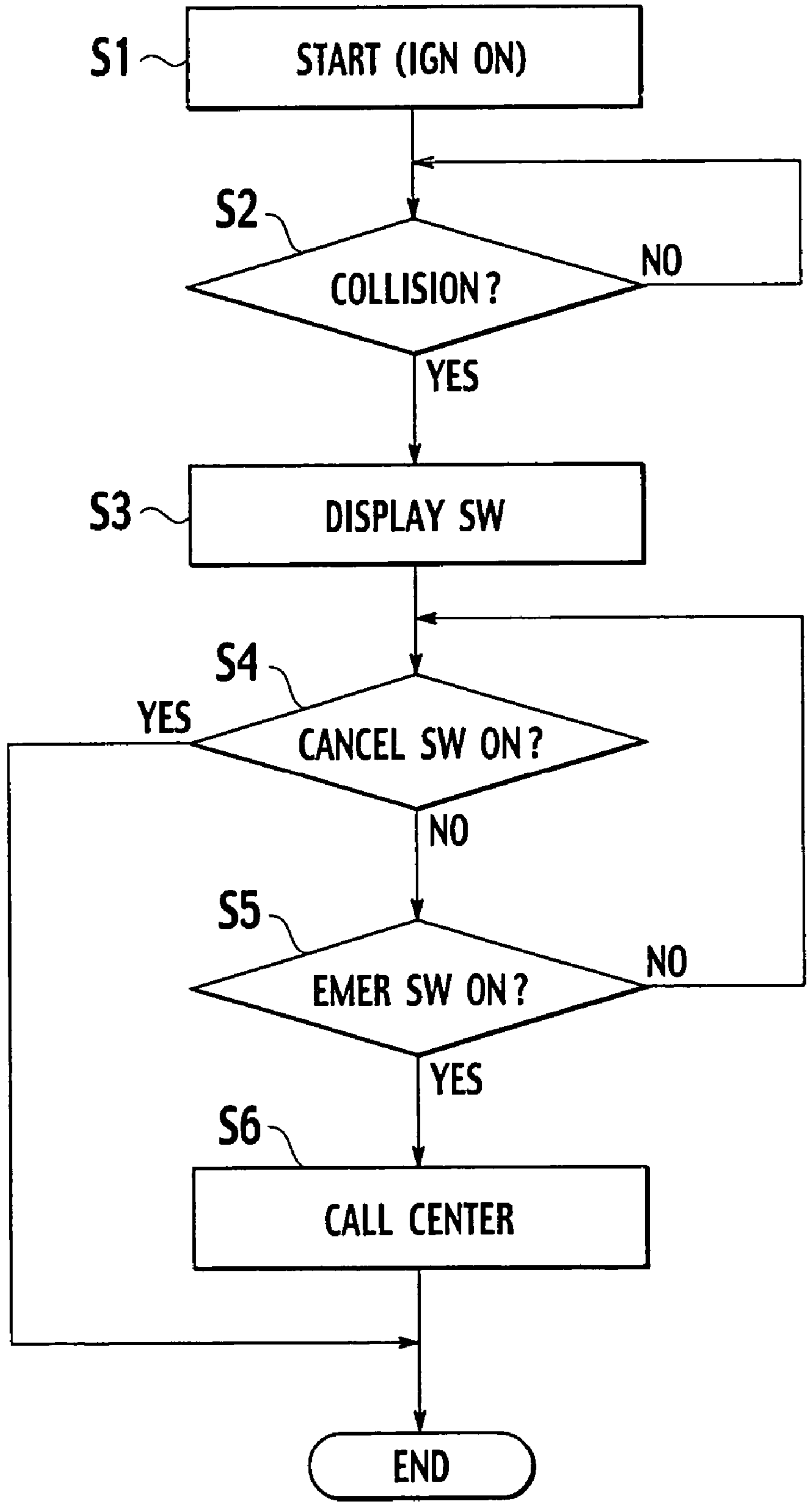
FIG. 4 is a flowchart illustrating a basic sequence of operations of the vehicle emergency notification system of the presently filed embodiment.

FIG. 4 is a flowchart illustrating a basic sequence of operations of the vehicle emergency notification system 100.

As shown in FIG. 4, first in step S1, if an ignition switch of the vehicle V is turned on, a series of operations are initiated and the operation proceeds to S2.

In succeeding step S2, the lift-up hood system 10 discriminates whether to effectuate the lift-up of the hood 1. In particular, discrimination is made to find whether the collision sensor 7 senses the occurrence of collision between the vehicle and an obstacle, that is, whether a detection signal S1 is applied to the lift-up hood system 10. Incidentally, in this step, when discriminated that the collision with the obstacle has occurred, the operation is also executed to lift up the hood 1. In step S2, if the collision with the obstacle is detected, the operation proceeds to step S3, and if such a collision is not detected, the operation in step S2 is executed again.

In subsequent step S3, the air bag control unit 20 executes the operation to allow the activation of the operation switch 30 in response to the actuation signal S2 delivered from the lift-up hood system 10. In particular, the permission signal S3 is transmitted to the operation switch 30 from the air bag control unit 20 to provide a display of the emergency switch 30*a* and cancel switch 30*b* shown in FIG. 3, over the display screen 50 of the display device 5.

Subsequently, the operation is routed to step S4 where the air bag control unit 20 discriminates in response to the operation signal S4 to find whether an occupant touches the cancel switch 30*b* for turning on the same.

More particularly, when discrimination is made that, under such a condition, the occupant has touched the cancel switch 30*b* to turn on the same, no need arises for transmitting an emergency notification signal and the succeeding operations are not executed to terminate the current operation. In contrast, if in step S4, discrimination is made that the occupant does not turn on the cancel switch 30*b*, the operation is routed to step S5.

In consecutive step S5, the air bag control unit 20 discriminates in response to an operation signal S4' to find whether the occupant touches the emergency switch 30*a* to turn on the same. In particular, when the occupant turns on the emergency switch 30*a* in the event of a collision with a pedestrian, forming the obstacle, that is, in a case where an emergency request is needed, the operation proceeds to succeeding step S6 and in step S6, the air bag control unit 20 transmits an emergency notification signal S5 to the emergency call section 40. This allows the emergency call section 40 to transmit an emergency notification signal S6, indicating the content of the occurrence of the collision with the pedestrian, to the rescue center 200 such that the rescue center 200 is able to surely recognize the occurrence of such a collision. And, the series of current operations are terminated.

On the contrary, in step S5, if the air bag control unit 20 discriminates that the occupant does not turn on the emergency switch 30*a*, the operation is routed back to step S4 where discrimination is executed again to find whether the occupant touches the cancel switch 30*b* to turn on the same.

As set forth above, with the vehicle emergency notification system 100 of the presently filed embodiment, if the collision sensor 7 senses the collision with the obstacle, the hood 1 is lifted up while providing a display of the operation switch (emergency switch 30*a* and cancel switch 30*b*) 30 such that when the occupant touches the emergency switch 30*a*, the emergency notification signal is automatically transmitted to the rescue center, resulting in a capability of reliably calling a rescue request when needed.

Further, the emergency notification signals S5, S6 are transmitted under "AND" condition between the input of the detection signal S1, delivered from the collision sensor 7, and the input of the operation signal S4' associated with the turning-on of the emergency switch 30*a* effectuated by the occupant, thereby reliably avoiding a probability in the occurrence of an emergency notification signal being transmitted as a result of inadvertent erroneous operation.

Furthermore, since the operation switch (emergency switch 30*a* and cancel switch 30*b*) 30 is displayed over the display screen 50 of the display device 5 of the navigation device during judgment of the collision, awareness ability of the occupant can be improved.

Incidentally, although the presently filed embodiment discussed above has been described in conjunction with an exemplary structure in which the air bag control unit 20 and the emergency call section 4 are combined in use, an alternative structure may be such that the lift-up hood system 10 and the emergency call section 4 are combined and in such case, it is possible for the lift-up hood system 10 to have a structure in which the operation switch 30 is controlled so as to transmit the emergency notification signal S5 to the emergency call section 40.

Moreover, the presently filed embodiment may take the form of a system wherein air bag deployment operation to be performed by the air bag control unit 20 is distinguished from hood lift-up operation to be performed by the lift-up hood system 10 whereby when the actuation signal S2 is generated by the lift-up hood system 10, a call can be established between the rescue center and the occupant.

Besides, while the presently filed embodiment has been described in conjunction with an exemplary case with a structure wherein the touch switches 30*a*, 30*b* are employed as the operation switch 30, the operation switch is not limited thereto and it is, of course, possible to employ press button switches normally in use.

Additionally, while the presently filed embodiment has been described in conjunction with an exemplary case with a structure wherein the operation switch 30 is comprised of the emergency switch 30*a* and cancel switch 30*b*, the cancel switch 30*b* may be dispensed with when desired to simplify the structure.

The entire content of a Patent Application No. TOKUGAN 2003-346020 with a filing date of Oct. 3, 2003 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A vehicle emergency notification system installed on a vehicle to transmit an emergency notification signal to a base station when a collision occurs, the system comprising:

a collision sensor sensing a collision of a vehicle to transmit a detection signal;

a notification switch having an emergency switch whose operation is permitted to transmit an operation signal when the collision sensor senses the collision; and a communicating section transmitting an emergency notification signal to a base station, the communicating section allowing the emergency notification signal to be transmitted to the base station when the detection signal from the collision sensor is inputted and the operation signal from the emergency switch is inputted, wherein the notification switch includes a touch type switch to be displayed over a display screen of a display device, installed on the vehicle, when the collision sensor senses the collision.

2. The vehicle emergency notification system according to claim 1, further comprising a lift-up hood system operative to lift up a hood of the vehicle when the collision sensor senses the collision, wherein the operation of the notification switch is permitted when the lift-up hood system is actuated.

3. The vehicle emergency notification system according to claim 1, wherein the lift-up hood system lifts up a rear end of the hood upward.

4. The vehicle emergency notification system according to claim 1, further comprising an air bag control unit deploying an air bag when the collision sensor senses the collision, wherein the operation of the notification switch is permitted by the air bag control unit, and the emergency notification signal is generated by the air bag control unit to be transmitted through the communicating section to the base station.

5. The vehicle emergency notification system according to claim 1, wherein when the notification switch is not turned on, the emergency notification signal is not transmitted.

6. A vehicle emergency notification system installed on a vehicle to transmit an emergency notification signal to a base station when a collision occurs, the system comprising:

a collision sensor sensing a collision of a vehicle to transmit a detection signal;

a notification switch having an emergency switch whose operation is permitted to transmit an operation signal when the collision sensor senses the collision; and a communicating section transmitting an emergency notification signal to a base station, the communicating section allowing the emergency notification signal to be transmitted to the base station when the detection signal from the collision sensor is inputted and the operation signal from the emergency switch is inputted, wherein a cancel switch, selecting not to transmit the emergency notification signal, is displayed in an area near the notification switch.

7. The vehicle emergency notification system according to claim 6, wherein when the cancel switch is turned on, the emergency notification signal is not transmitted.

8. A vehicle emergency notification system installed on a vehicle to transmit an emergency notification signal to a base station when a collision occurs, the system comprising:

collision detection means for detecting a collision of a vehicle to transmit a detection signal;

notification selection means for selecting notification to a base station, the notification selection means having an emergency switch whose operation is permitted to transmit an operation signal when the collision detection means detects the collision; and communication means for transmitting an emergency notification signal to the base station and operative to transmit the emergency notification signal to the base station when the detection signal from the collision detection means is inputted and the operation signal from the emergency switch is inputted, wherein the notification selection means includes a touch type switch to be displayed over a display screen of a display device, installed on the vehicle, when the collision detection means detects the collision.

9. A vehicle emergency notification method transmitting an emergency notification signal to a base station when a collision of a vehicle occurs, the method comprising:

detecting a collision of a vehicle by a collision sensor to transmit a detection signal;

displaying a notification switch when the collision is detected, the notification switch having an emergency switch whose operation is permitted to transmit an operation signal when the collision sensor senses the collision; and transmitting an emergency notification signal to a base station when the detection signal from the collision sensor is inputted and the operation signal from the emergency switch is inputted, wherein the notification switch includes a touch type switch to be displayed over a display screen of a display device, installed on the vehicle, when the collision is detected.

* * * * *